(12) United States Patent
Brzyski

(10) Patent No.: US 6,745,925 B2
(45) Date of Patent: Jun. 8, 2004

(54) ENCLOSED CASE FOR TOLL TRANSPONDER

(76) Inventor: Walter Brzyski, 716 Newman Springs Rd., Lincroft, NJ (US) 07738

( * ) Notice: Subject to any disclaimer, the term of this patent is extended or adjusted under 35 U.S.C. 154(b) by 58 days.

(21) Appl. No.: 10/213,226

(22) Filed: Aug. 6, 2002

(65) Prior Publication Data

US 2003/0034368 A1 Feb. 20, 2003

Related U.S. Application Data

(63) Continuation-in-part of application No. 09/653,912, filed on Sep. 1, 2000, now abandoned.

(51) Int. Cl.[7] .................................................. B60R 7/00
(52) U.S. Cl. .................... 224/482; 224/559; 40/593; 40/597; 40/644; 248/206.2; 248/206.3
(58) Field of Search ................................. 224/482, 483, 224/277, 278, 539, 559, 567, 901.6; 40/594, 593, 597, 643, 644, 649; 248/206.2, 206.3, 363; 206/720; D3/247

(56) References Cited

U.S. PATENT DOCUMENTS

| | | | | |
|---|---|---|---|---|
| 1,739,801 A | * | 12/1929 | Pitts | 220/483 |
| 2,698,155 A | * | 12/1954 | Bowman | 248/311.2 |
| 4,957,254 A | * | 9/1990 | Hill et al. | 248/207 |
| 5,190,197 A | * | 3/1993 | Novak | 224/312 |
| 5,533,809 A | * | 7/1996 | Gorman | 383/11 |
| 5,678,793 A | * | 10/1997 | Hill | 248/206.3 |
| D397,365 S | * | 8/1998 | Johnson | D20/43 |
| 5,850,957 A | * | 12/1998 | Morris | 224/277 |
| 5,960,572 A | * | 10/1999 | DeVito | 40/593 |
| 6,127,938 A | * | 10/2000 | Friedman | 340/693.6 |
| 6,196,435 B1 | * | 3/2001 | Wu | 224/572 |
| D477,909 S | * | 8/2003 | Harris | D3/247 |

* cited by examiner

*Primary Examiner*—Stephen K. Cronin
(74) *Attorney, Agent, or Firm*—Robert M. Skolnik

(57) ABSTRACT

An automatic toll detector case, formed of flexible material, has sidewalls, front and rear walls, a bottom wall, and a folding cover. The cover folds so that an extended portion of the rear wall folds over the open top of the case to enclose the toll detector. The cover is fastened to the case by a hook and eye fastener. The case is mounted to the interior of the vehicle's windshield by suction cups attached to the flexible material of the case with an E clip.

4 Claims, 4 Drawing Sheets

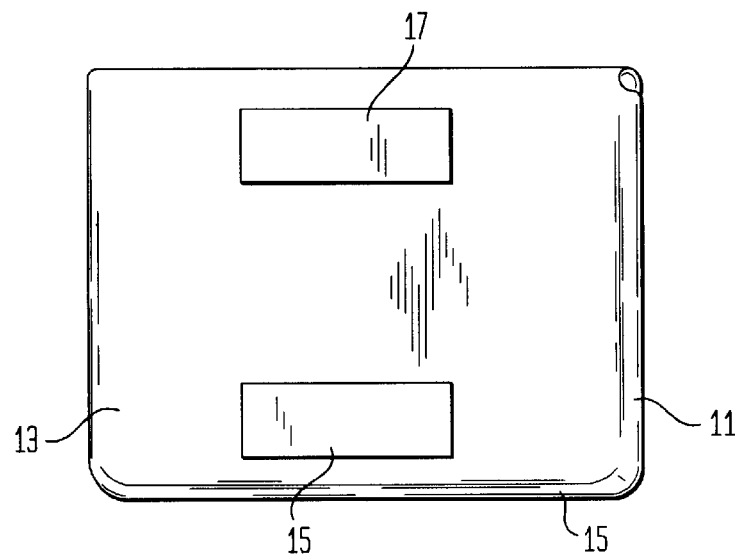
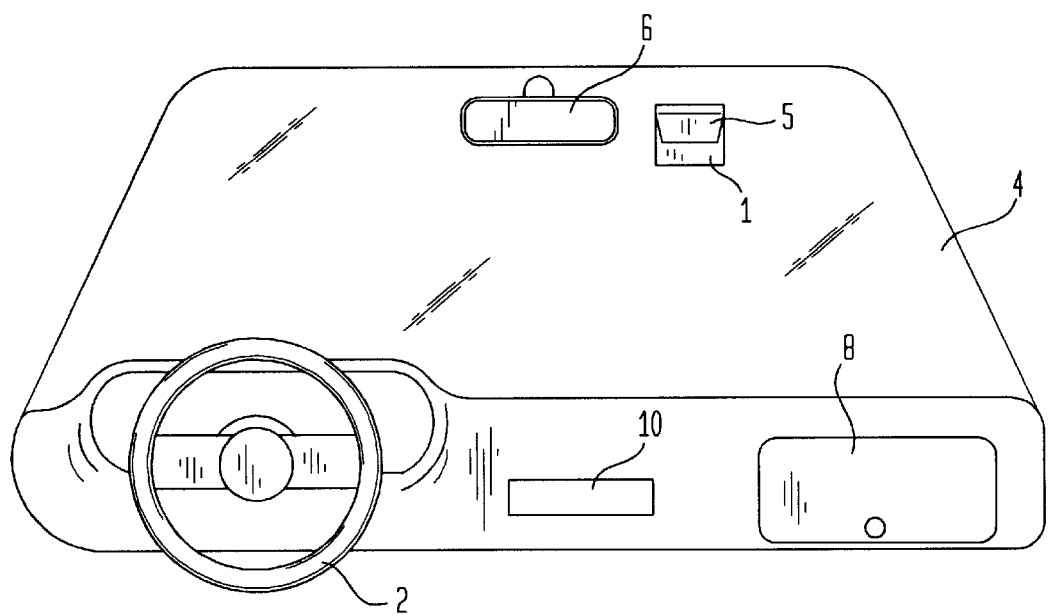

ENCLOSED CASE FOR TOLL TRANSPONDER

CROSS-REFERENCE TO RELATED APPLICATIONS

This application is a continuation in part of my application Ser. No. 09/653,912, filed Sep. 1, 2000, now abandoned.

BACKGROUND OF THE INVENTION

1. Field of the Invention

The present invention relates to an enclosed case for a toll transponder. The enclosed case of the present invention provides a soft flexible housing for the transponder. The case is mounted to the interior of a vehicle's windshield.

2. Description of the Related Art

Various devices that attach to a vehicle windshield or other supports are shown in the prior art.

Griggs U.S. Pat. No. 3,237,327, issued Mar. 1, 1966 shows a transparent envelope having three magnets attached thereto for securing the envelope to the vehicle dashboard. The envelope can hold vehicle paperwork such as a registration certificate.

Stanos U.S. Pat. No. 3,327,419, issued Jun. 27, 1967, FIG. 4, shows VELCRO portions to affix a card to a display stand.

Ramee U.S. Pat. No. 3,531,880, issued Oct. 6, 1970 discloses a combined magnetic/suction mount dashboard device for displaying a parking permit and automatic gate key.

Hernandez U.S. Pat. No. 4,184,276, issued Jan. 22, 1980 describes a slotted support for vehicle paperwork, which is adhesively affixed to the windshield.

Tompkins U.S. Pat. No. 4,951,826 issued Aug. 28, 1990 uses VELCRO to affix compact discs to a display stand in a manner similar to Stanos.

Sigler U.S. Pat. No. 4,989,819, issued Feb. 5, 1991 relates to a special plastic material for fastening a display device to window glass.

Bird U.S. Pat. No. 5,428,353, issued Jun. 27, 1995 mounts a vehicle charge detector on a frame support cradle.

Kauffman U.S. Pat. No. 5,485,944 issued Jan. 23, 1996 uses a VELCRO mounting to the interior of a vehicle windshield for a portion a note pad mounted on the dashboard.

LeBoff, et al, U.S. Pat. No. 5,502,912, issued Apr. 2, 1996 is a mechanical system for mounting vehicle documentation to the interior of the windshield.

DeVito U.S. Pat. No. 5,960,572 issued Oct. 5, 1999 affixes an EZ pass into a housing mounted on the windshield with suction cups. The housing has an open top to permit the toll pass to be inserted therein. Springs are provided in the housing to hold the pass in the device.

Other patents are Novak, U.S. Pat. No. 5,190,197; Hagglund, U.S. Pat. No. 4,962,874; Sicotte, et al., U.S. Pat. No. 5,240,156; Gorman, U.S. Pat. No. 5,553,809; Freidman, U.S. Pat. No. 6,127,938; Kallman, U.S. Pat. No. 4,418,733; Moss, U.S. Pat. No. 4,548,375; and Dolenc U.S. Pat. No. 5,031,808.

The prior art devices shown above are generally characterized by mechanical complexity in structure and in design.

SUMMARY OF THE INVENTION

Automatic toll collection is known. Such automatic collection involves the mounting of a toll pass detector device on a vehicle location, usually on the interior of the windshield in proximity to the location of the windshield-mounted rear view mirror. These toll pass detectors are removably attached to the windshield as by hook and eye connectors sold under the trademark VELCRO, adhesive strips or a supporting frame attached by suction cups.

While such detectors can, directly, be removably mounted to the windshield, their appearance both from the interior and exterior of the vehicle may be undesirable. The detectors are usually provided in bright colors and the eye is drawn to them.

The use of VELCRO or adhesives requires two parts, one part attached permanently to the windshield (usually by adhesive) and a second part attached to the toll pass detector which is removably attached to the first part. The parts may attach by adhesive or by hook and eye connector. The advantage in using suction cups is that nothing needs to be permanently attached to the windshield.

The present invention permits vehicle drivers to regain the original appearance of their vehicle windshield by covering the automatic toll detector when it is applied to the interior of the windshield. The invention provides protection and concealment of the toll detector without inhibiting the function of the detector. The invention may be offered bearing custom imprints and designs thereon and in colors that may be selected to match the interior and exterior appearance of the vehicle.

The present invention includes case for the detector. The case is formed of a flexible material so that the detector may be securely held therein. The case is covered at its top to provide secure storage for the detector. In one embodiment of the invention, the case is affixed to the interior of the vehicle windshield by hook and eye connectors. In another embodiment of the invention, the case is affixed to the interior of the vehicle windshield by suction cups affixed to the flexible material forming the rear wall of the case. As thus provided, the case provides storage for the detector when it is removed from the windshield and a mounting support for the detector when it is affixed to the windshield.

A principal object and advantage of the invention is the provision housing for a toll collection detector.

Another object and advantage of the invention is the provision of a case for a toll collection detector that can be affixed to a vehicle windshield.

A still further object of the invention is the provision of a case for a toll collection device that is formed of relatively soft flexible material.

Another object and advantage of the invention is the provision of a case which may be embellished by logos, advertisements, emblems, decorations and the like.

Another object and advantage of the invention is the provision of case for a toll collection detector which protects the detector when in use or in storage.

A still further object and advantage of the invention is the provision of a detector case that is removable attached to the interior of a vehicle windshield.

A still further object and advantage of the invention is the provision of a case formed of a soft flexible material having suction-sups affixed to the soft material for attaching the case to the interior of the windshield of a vehicle.

The foregoing, as well as further objects and advantages of the invention will become apparent to those skilled in the art from a review of the following detailed description of my invention, reference being made to the accompanying drawings.

BRIEF DESCRIPTION OF THE DRAWINGS

FIG. 3 is a perspective back view of the device shown in FIG. 2;

FIG. 4 is diagrammatic view from the interior of a vehicle showing the device of FIG. 1 in use;

DETAILED DESCRIPTION OF THE PREFERRED EMBODIMENT

Figure 1:
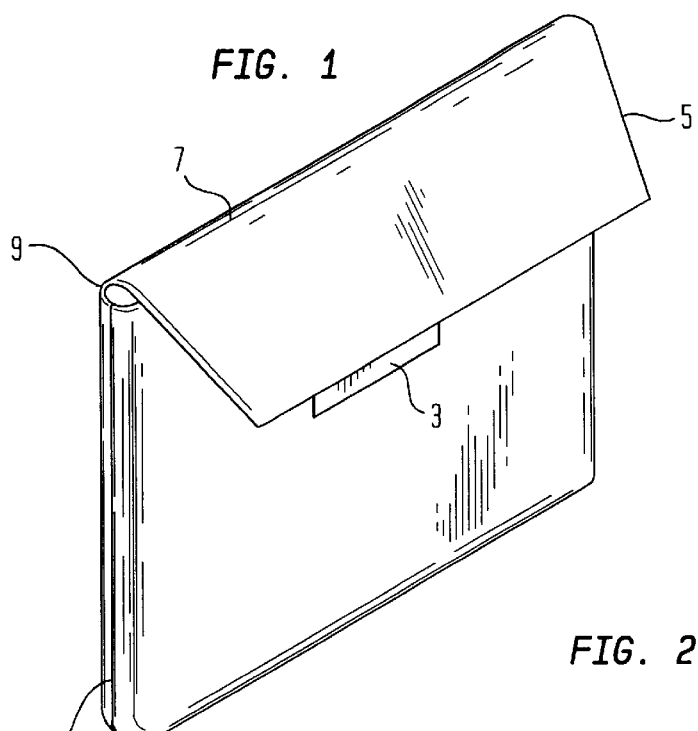
FIG. 1 is a perspective view of my invention, partially open.
Figure 2:
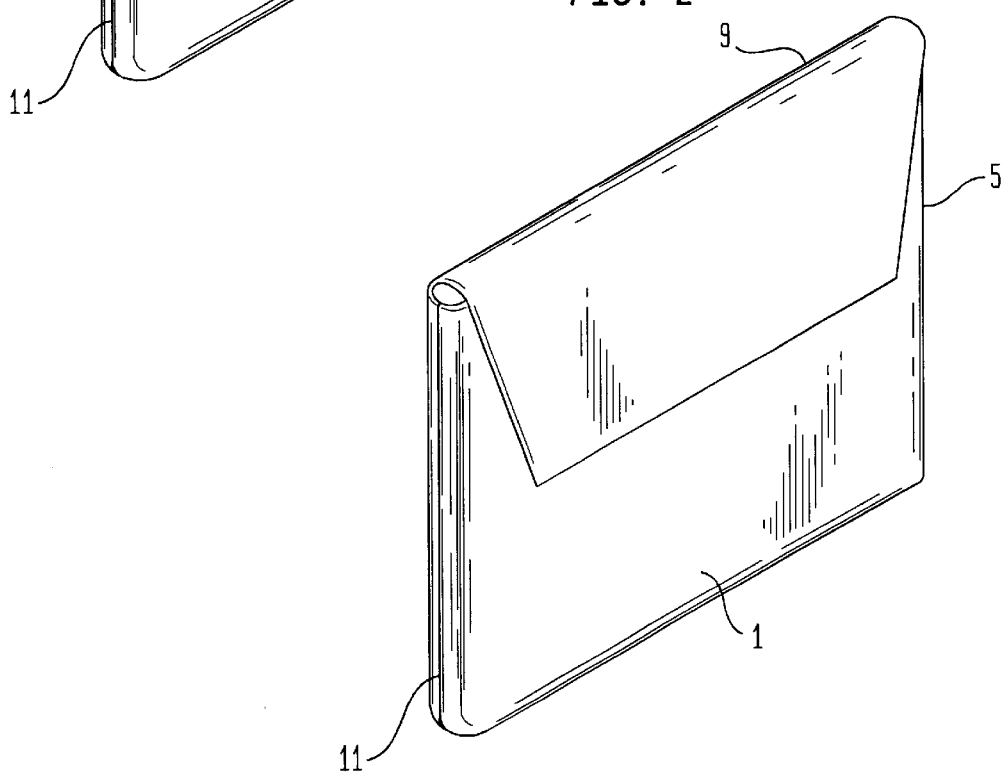
FIG. 2 is a perspective view side of the device shown in FIG. 1, closed.

As shown in FIGS. 1–3, where like reference numerals are used to designate like parts, the toll detector case of the present invention is shown generally at 1. The case has side walls (one of which is shown at 11), a bottom wall 19, a rear wall 13, a front wall, and a folding cover 7. The cover folds along a line 7. An extended portion 9 of the rear wall 13 of the detector case folds over the open top of the case to enclose the toll detector. The cover 5 is fastened to the case by a hook and eye fastener one portion of which is shown at numeral 5.

FIG. 3 is a rear view of the device of FIGS. 1–2. Hook and eye connector portions 15 and 17 are affixed to the rear wall surface 13 of the case 1. As will be described below, the connector portions 15 and 17 mount the case 1 to corresponding connector portions affixed to the interior of a vehicle's windshield.

Figure 5:
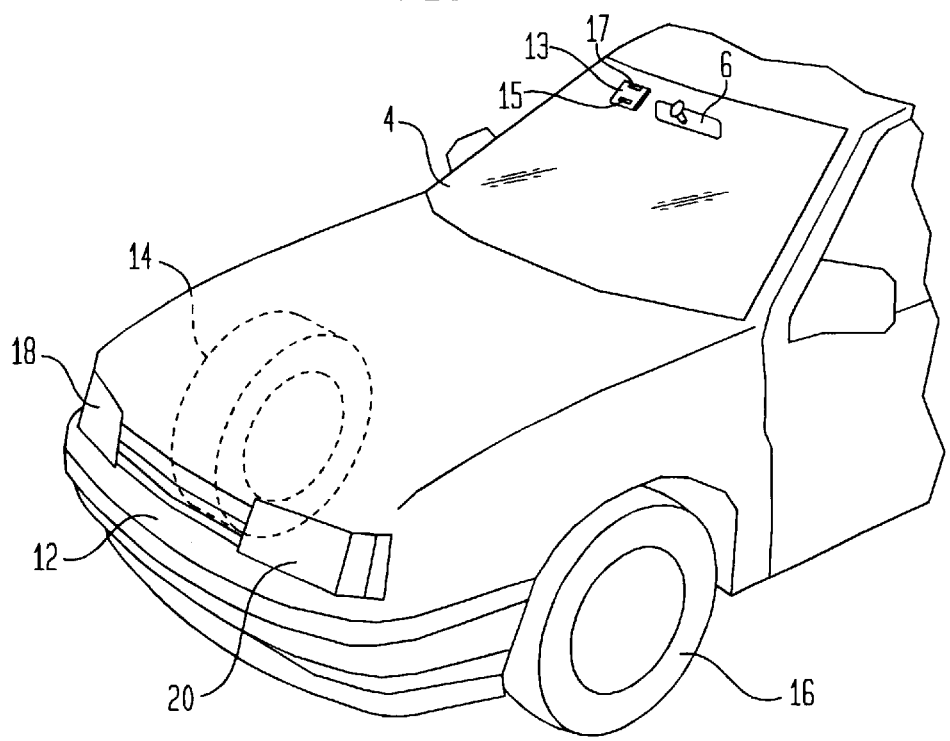
FIG. 5 is a diagrammatic view from the exterior of a vehicle showing the device of FIG. 1, in use.

FIGS. 4–5 are diagrammatic views of the interior and exterior of a vehicle seen through its windshield 4. In FIG. 4, numerals 2, 10 and 8 represent the vehicle's steering wheel, radio and glove compartment, respectively. Numeral 6 is the rear view mirror. The case 1 is located to the right of the mirror approximately laterally of the mirror. FIG. 5 is a diagrammatic view of the exterior of the vehicle of FIG. 4 through the windshield 4. In FIG. 5, numerals 18 and 20 represent the vehicles headlights, 14 and 16 are the front tires and 12 is the front grille. As also shown in FIG. 4, the detector case is mounted adjacent the rear view mirror 6.

Figure 6:
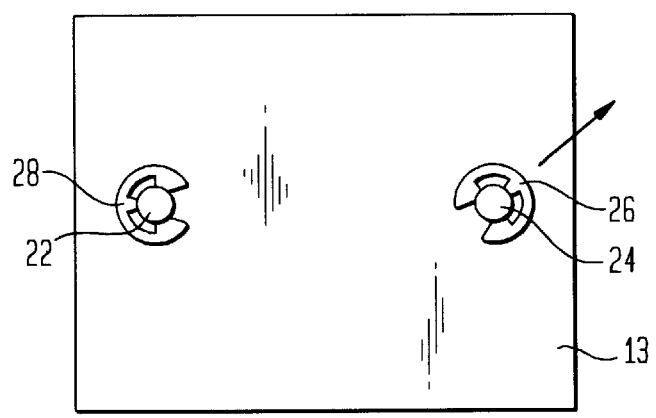
FIG. 6 is a back view of another embodiment of the invention.
Figure 7:
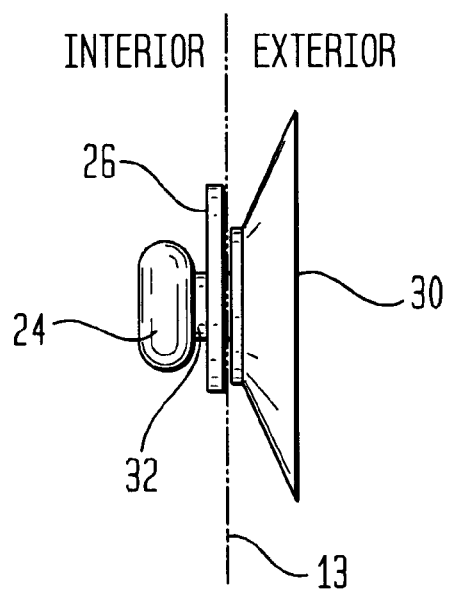
FIG. 7 is a side view of the embodiment shown in FIG. 6.
Figure 8:
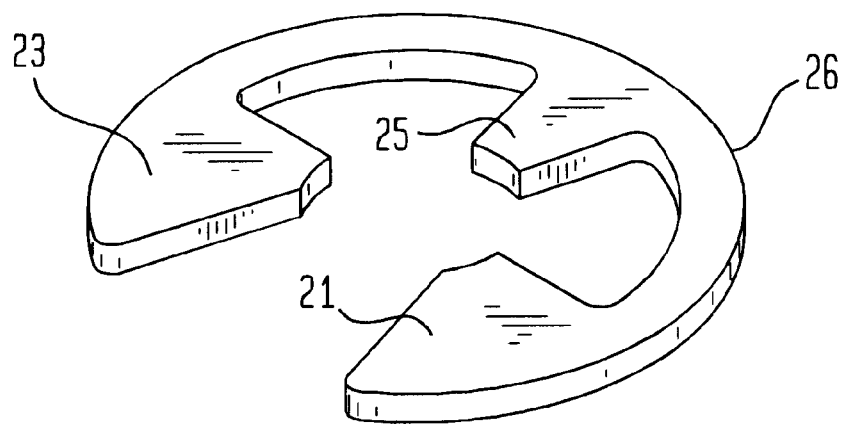
FIG. 8 is a front view of the clip used in FIGS. 6–7.

FIGS. 6–8 show another embodiment of the enclosure described in FIGS. 1–5. The embodiment of FIGS. 6–8 is affixed to the windshield by suction cups. Each suction cup is mounted in an aperture in the rear flexible wall of the enclosure with an "E clip" affixed to the narrow neck of the suction cup and adjacent to the interior of the rear flexible wall of the enclosure.

As shown in FIGS. 6–8, the interior of rear wall 13 has two suction cups (30 in FIG. 7) attached thereto by E clips 26 and 28. The E clips attach to the narrow neck portion 32 of the suction cup 30 formed between the suction cup 30 and a bulbous head portion 22 and 24. As shown in FIG. 8, the E clip 26 has several flexible fingers 21, 23, 25 formed integrally therewith to securely hold the E clip on the neck. The body of the E clip may periodically come into contact with the interior surface of the soft material rear wall to prevent separation of the suction sup from the rear wall.

Further modifications to the apparatus of the invention may be made without departing from the spirit and scope of the invention; accordingly, what is sought to be protected is set forth in the appended claims.

What is claimed is:

1. A case for an automatic toll collection device comprising: a flexible enclosure comprising a front wall, a back wall, two side walls and a bottom wall, a cover portion connected to said back wall and extending from said back wall to a portion of said front wall, said walls and said cover defining an enclosed space for an automatic toll collection device; fastening means connected to said back wall for fastening said case to the windshield of a vehicle; and fastening means connected to said cover portion for fastening said cover portion to said front wall, said flexible enclosure having an aperture formed in said back wall, said fastening means including at least one suction cup connected to said flexible enclosure, a portion of said suction cup extending through said aperture into the interior of said case, and clipping means attached to said portion of said suction cup and contacting interior of said back wall for supporting said suction cup on said back wall.

2. An enclosure for mounting and storing an automatic toll detector comprising: an enclosure formed of a soft flexible material and fastening means for connecting said enclosure to the windshield of a vehicle; an aperture formed in said flexible enclosure, said fastening means including at least one suction cup connected to said flexible enclosure, a portion of said suction cup extending through said aperture into the interior of said enclosure, and clipping means attached to said portion of said suction cup extending through said enclosure and contacting the interior of said enclosure for supporting said suction cup on said enclosure.

3. A case for an automatic toll collection device comprising: a flexible enclosure with a front wall, a back wall, two side walls and a bottom wall, a cover portion connected to said back wall and extending from said back wall to cover a substantial portion of said front wall, said walls and said cover defining an enclosed space for an automatic toll collection device; first fastening means connected to said back wall for fastening said case to the windshield of a vehicle; and second fastening means connected to said cover portion for fastening said cover portion to said front wall, an aperture formed in said back wall, said first fastening means including at least one suction cup connected to said flexible enclosure, a portion of said suction cup extending through said aperture into the interior of said enclosure, and spring clipping means attached to said portion of said suction cup extending through said enclosure, and contacting the interior of said enclosure for supporting said suction cup on said enclosure.

4. The case of claim 3 wherein said spring clipping means includes a clip having a plurality of fingers.

* * * * *